No. 649,733. Patented May 15, 1900.
J. P. LAVIGNE.
DIE HEAD.
(Application filed May 29, 1899.)
(No Model.) 2 Sheets—Sheet 1.
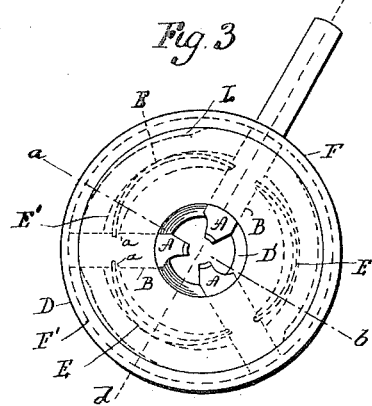
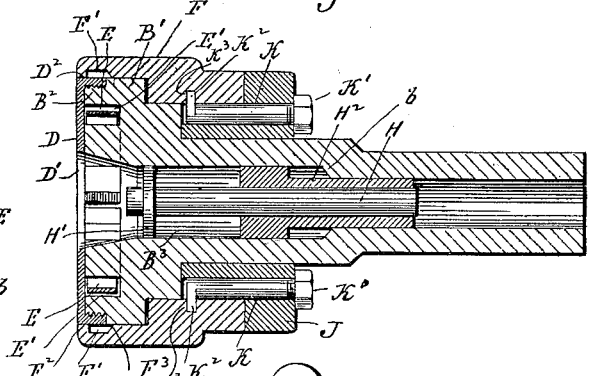
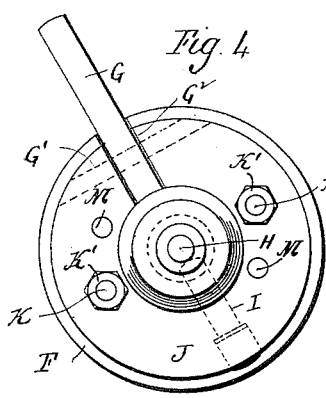
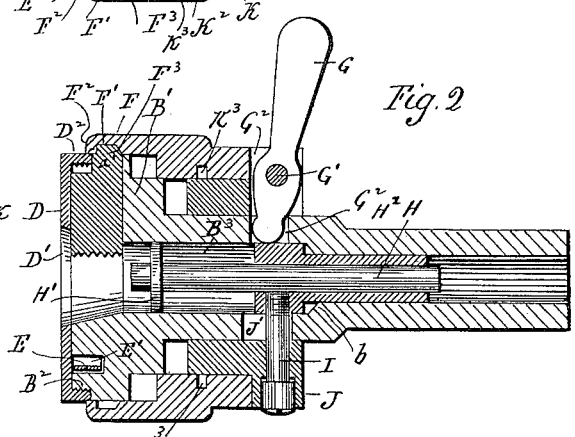
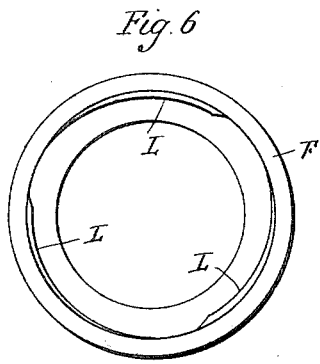
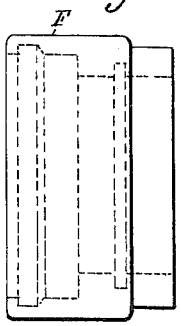
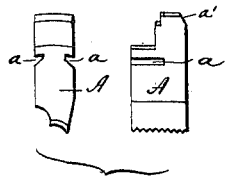

No. 649,733. Patented May 15, 1900.
J. P. LAVIGNE.
DIE HEAD.
(Application filed May 29, 1899.)
(No Model.) 2 Sheets—Sheet 2.
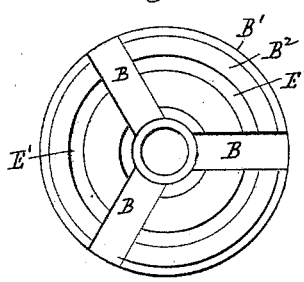
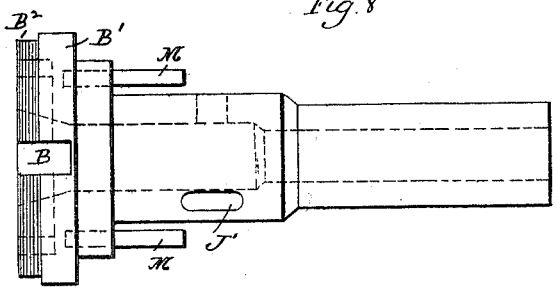
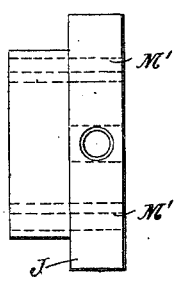
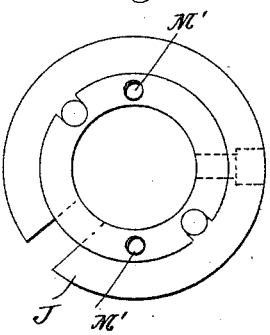
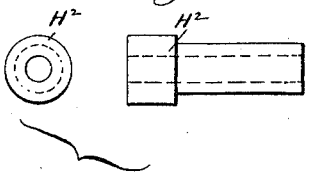
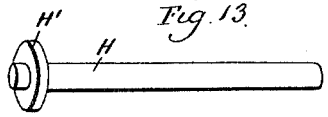

UNITED STATES PATENT OFFICE.

JOSEPH P. LAVIGNE, OF NEW HAVEN, CONNECTICUT.

DIE-HEAD.

SPECIFICATION forming part of Letters Patent No. 649,733, dated May 15, 1900.

Application filed May 29, 1899. Serial No. 718,682. (No model.)

*To all whom it may concern:*

Be it known that I, JOSEPH P. LAVIGNE, of New Haven, in the county of New Haven and State of Connecticut, have invented a new Improvement in Die-Heads; and I do hereby declare the following, when taken in connection with the accompanying drawings and the letters of reference marked thereon, to be a full, clear, and exact description of the same, and which said drawings constitute part of this specification, and represent, in—

Figure 1, a view in vertical section of a die-head constructed in accordance with my invention; Fig. 2, a sectional view of the die-head, showing it in its open position and taken on a different line, so as to bring the operating-lever and coupling-screw into view; Fig. 3, a view of the device in front elevation; Fig. 4, a corresponding view in rear elevation; Fig. 5, a detached view, in side elevation, of the shell; Fig. 6, a corresponding front view thereof; Fig. 7, a view showing one of the cutters in side elevation as well as in front elevation; Fig. 8, a detached view, in side elevation, of the body of the device; Fig. 9, a view thereof in front elevation; Fig. 10, a view in rear elevation of the collar of the device; Fig. 11, a view thereof in side elevation; Fig. 12, a view comprising views in front and side elevation of the throw-off-pin holder; Fig. 13, a perspective view of the throw-off pin.

My invention relates to an improvement in automatic die-heads, the object being to produce a simple, compact, and effective device constructed with particular reference to capacity for adjustment and convenience of operation.

With these ends in view my invention consists in certain details of construction and combinations of parts, as will be hereinafter described, and pointed out in the claims.

As herein shown, my improved automatic die-head is designed to employ three corresponding cutters A, Fig. 7, though two or more may be employed, if preferred. The said cutters have sliding movement, respectively, in three radially-arranged slots B, formed in the outer end of the body B' of the device, and are held in place in the said slots by means of a cap D, formed with a large central opening D' for the exposure of the inner ends of the cutters and having its edge turned inward to form a flange $D^2$, which is internally threaded for being screwed upon a threaded annular shoulder $B^2$, formed at the extreme forward end of the said body. The edges of these cutters are formed about midway of their length with oppositely-located notches $a$, which receive the ends of three bowed springs E, all corresponding to each other in form and respectively located in three segmental grooves E', formed in the forward face of the said body. These grooves are all located in the same circle and may be viewed as a continuous circular groove intersected by the radial slots B, formed for the reception of the cutters. The said springs when thus constructed and arranged operate to exert a constant effort to automatically move the cutters outward into their retired positions. To permit this movement, the shell F of the device is formed near its forward edge with what I may call an "annular clearance-groove" F', into which the outer ends of the cutters are entered when so moved. The said shell which encircles the body B' is adapted to be moved back and forth within narrow limits over the same. The extreme forward end of the said shell is formed with an inwardly-turned stop-flange $F^2$, which engages with the outer corners of the outer ends of the cutters when they are in their open or retired positions, into which they are moved by their springs in time to thus automatically stop and limit the rearward or opening movement of the shell. For the purpose of this engagement the said corners of the cutters are formed with small notches $a$, as seen in Fig. 7. The rear wall of the clearance-groove F' aforesaid is cut away to form a cutter-closing bevel $F^3$, which engages with corresponding bevels $a'$, formed upon the upper rear corners of the cutters, and forces the same inward into their operating positions when the shell is moved into its closed position, which is effected by the action of a closing-lever G, pivoted in it upon a pivot G' and entering a recess $G^2$ in the body B', which thus forms a point of purchase for the action of the lever, which is operated by engagement with some fixed point located outside of the die-head. The said rearward or opening movement of the shell is automatically effected by means of a throw-off pin H, located in a cylindrical longitudinal chamber B³, formed in the body B', the said pin extending forward in the said chamber to a point just in rear of the rear edges of the cutters A. By preference this throw-off pin H is formed with an annular guard-flange H', which prevents chips and other foreign material from working inward into the chamber B³. It is mounted in an adjustable plug-like holder H², comprising a head and shank, and located in the rear end of the said chamber B³, which extends throughout the length of the body and which is smaller at its rear end than at its forward end, a shoulder b being formed between the large and small diameters of the chamber for the head of the holder to abut against, as clearly shown in Fig. 3. A coupling-screw I, entering the said head of the holder, engages with the throw-off pin for holding it in any desired position of adjustment. This screw is mounted in the rear end of a collar J and passes through a slot J', formed in the body B', as clearly shown in Fig. 8, the said screw constituting a coupling between the pin-holder and the shell F, which is adjustably secured to the said collar J by means of two dog-screws K K, located diametrically opposite each other in the collar and provided at their outer ends with nuts K', which hold them in place. The inner ends of these dog-screws are formed with fingers K², which enter an annular coupling-groove K³, formed within the rear portion of the shell, which the dog-screws couple to the collar, so as to normally prevent the shell from rotating, but so as to permit the shell to be rotated with respect to the collar for changing the throw of the cutters A, the outer ends of which are respectively engaged with three long cams L, Fig. 6, formed within the shell at a point just to the rear of the cutter-closing bevel F³ before described. When it is desired to change the throw of the cutters, the dog-screws K are sufficiently loosened to permit the rotation of the shell, which is then turned in one direction or the other, as desired, after which the dog-screws are tightened again. To prevent the shell and collar from rotating with respect to the head, I employ two guide-pins M M, located opposite each other and arranged parallel with the longitudinal axis of the body for entrance into guide-pin holes M' M', Fig. 10, formed in the collar J.

In using my improved die-head after the screw or other object has been threaded by the cutters, but before its inward movement between the same has been stopped, it engages with the forward end of the throw-off pin H, which it forces rearward, and hence the throw-off-pin holder H² and the coupling-screw I, which is mounted in the collar J, whereby the said collar and the shell are moved rearward, so as to bring the clearance-groove F' of the shell into registration with the outer ends of the cutters, which are then immediately thrown outward by their springs E, so that their inner ends will clear the work. When the cutters are thus moved outward, their outer ends are engaged by the stop-flange F² of the shell, the rearward or opening movement of which is thus automatically arrested, leaving the cutters in their retired positions. Now before the die-head reaches the limit of its rearward movement in the lathe the shell-closing lever G will be engaged with a fixed point properly located and thrown forward, whereby the shell F will be moved forward into its closed position, with the effect of automatically crowding the cutters back into their operating positions and bringing the parts of the die-head into the relations in which they are shown in Fig. 1.

I would have it understood that I do not limit myself to the exact construction herein shown and described, but hold myself at liberty to make such changes and alterations as fairly fall within the spirit and scope of my invention.

Of course the number of cutters employed may be varied. I may employ only two or more than three, as desired.

I am aware that it is old in devices of the kind to which my invention relates to employ a centrally-arranged adjustable throw-off instrumentality which is engaged by the object being cut and pushed inward for effecting the discontinuance of the cutting operation and do not claim such devices broadly.

Having fully described my invention, what I claim as new, and desire to secure by Letters Patent, is—

1. In a die-head, the combination with a body, of two or more radially-arranged cutters mounted therein, springs for moving the said cutters outward into their retired positions, and a normally-non-rotatable longitudinally-movable shell adapted, when longitudinally moved, to coact directly with the cutters for forcing them inward into their operating positions, and furnished with cams for adjusting the throw of the cutters for which purpose the shell is rotated.

2. In a die-head, the combination with a body, of two or more radially-arranged cutters mounted therein, springs for moving the said cutters outward into their retired positions, and a normally-non-rotatable longitudinally-movable shell, at its forward end coacting directly with the cutters for forcing the same inward into their operating positions, and provided with cams for adjusting the throw of the cutters for which purpose the shell is rotated and formed at its extreme forward end with an inwardly-turned stop-flange which engages with the outer corners of the outer ends of the cutters to limit the opening movement of the shell upon the body.

3. In a die-head, the combination with a body formed at its forward end with two or more radial slots and with a threaded annular shoulder, of cutters located in the said slots, a cap formed with an inwardly-turned threaded flange by means of which it is secured to the said shoulder of the body in the slots of which it confines the cutters, and a normally-non-rotatable longitudinally-movable shell extending entirely over the outer ends of the cutters, having sliding engagement with the said cap and when longitudinally moved forward engaging directly with the said outer ends of the cutters for forcing them inward into their operating positions.

4. In a die-head, the combination with a body, of two or more radially-arranged cutters mounted therein, springs coacting with the cutters for moving them outward into their retired positions, and a normally-non-rotatable longitudinally-movable shell coacting, when longitudinally moved, directly with the outer ends of the cutters for forcing them inward into their operating positions, and provided with as many cams as there are cutters for adjusting the throw of the same, the shell being adapted to be rotated with respect to the body for the adjustment of its cams with respect to the cutters, and constructed at its extreme forward end to engage with the outer corners of the outer ends of the cutters which thus limit the opening movement of the shell.

5. In a die-head, the combination with the body thereof, of two or more radially-arranged cutters mounted therein, springs coacting with the cutters for moving them outward into their retired positions, a non-rotatable collar having longitudinal sliding connection with the said body, and a normally-non-rotatable shell connected with the said collar for longitudinal movement therewith, coacting directly, when longitudinally moved, with the outer ends of the said cutters, and capable of rotary adjustment upon the said collar for changing the throw of the cutters, for which purpose it is furnished with cams.

6. In a die-head, the combination with a body, of two or more radially-arranged cutters mounted therein, springs coacting with the cutters for moving them into their retired positions, a non-rotatable collar connected with the body for longitudinal sliding movement with respect thereto, and a normally-non-rotatable shell coupled with the said collar for longitudinal movement therewith, furnished with a cam for each cutter, and adapted to be rotated upon the collar for changing the position of its cams with respect to the cutters.

7. In a die-head, the combination with a body, of two or more cutters mounted therein, springs for moving the cutters outward into their retired positions, a non-rotatable collar connected with the body for longitudinal sliding movement with respect thereto, a normally-non-rotatable shell connected with the said collar for longitudinal movement therewith, and provided with cams for adjusting the throw of the cutters the outer ends of which are directly engaged by the said cams, and one or more screw-dogs mounted in the collar and coacting with the shell for coupling the same with the collar, but permitting the shell to be rotated with respect to the collar for changing the position of its cams with respect to the cutters.

8. In a die-head, the combination with the body thereof, of two or more cutters mounted therein, springs coacting directly with the cutters for moving them outward into their retired positions, a non-rotatable longitudinally-movable shell adapted, when longitudinally moved, to coact directly with the outer ends of the cutters for forcing the same inward into their operating positions and provided with cams for adjusting the throw of the cutters for which purpose the shell is rotated, and a longitudinally-movable throw-off pin located within the body in position to be acted upon by the work, and coupled with the shell, whereby the inward movement of the pin moves the shell longitudinally and releases the outer ends of the cutters and permits the same to be moved into their retired positions by their springs.

9. In a die-head, the combination with a body, of two or more radially-arranged cutters mounted therein, springs coacting directly with the cutters for moving them outward into their retired positions, a normally-non-rotatable longitudinally-movable shell coacting at its forward end directly with the outer ends of the cutters for forcing the same inward into their operating positions, and provided with cams for adjusting the throw of the cutters for which purpose the shell is rotated, a throw-off-pin holder located within the body, a throw-off pin mounted in the said holder, and a coupling-screw entering the said holder, and coupling the same with the shell, whereby the impingement of the work against the outer end of the pin pushes the pin and the pin-holder inward and slides the shell longitudinally rearward so as to release the cutters for being moved into their retired positions by their springs.

10. In a die-head, the combination with the body thereof, of two or more radially-arranged cutters mounted therein, springs coacting directly with the cutters for moving them outward into their retired positions, a normally-non-rotatable longitudinally-movable shell adapted at its forward end to coact directly with the outer ends of the cutters and provided with cams for adjusting the throw of the cutters for which purpose the shell is rotated, and means connected with the shell for positively moving the same longitudinally forward into its closed position, in which movement it forces the cutters inward into their cutting positions.

11. In a die-head, the combination with a body, of cutters mounted therein, springs coacting directly with the cutters for moving the same outward into their retired positions, a normally-non-rotatable longitudinally-movable shell adapted at its forward end to coact directly with the outer ends of the cutters for forcing the same inward into their operating positions and provided with cams for adjusting the throw of the cutters for which purpose the shell is rotated, a throw-off pin located within the body, and connected with the shell for moving the same longitudinally rearward as the pin is moved inwardly, and a lever connected with the said shell, and projecting outward beyond the same in position to be utilized to move the shell longitudinally forward into its closed position, during which movement it forces the cutters inward into their operating positions.

12. In a die-head, the combination with the body thereof, of two or more radially-arranged cutters mounted therein, springs coacting with the cutters for moving the same into their retired positions, a sliding collar non-rotatably connected with the body, a shell connected with the said collar for being moved back and forth therewith, and adapted to coact with the outer ends of the cutters for releasing the same to permit their springs to move them into their retired positions, and for forcing them into their cutting positions, a throw-off pin located within the said body, a coupling-screw connecting the said throw-off pin with the collar, whereby the inward movement of the throw-off pin is communicated to the shell, and a closing-lever mounted in the said collar, and projecting radially therefrom and adapted to be engaged for moving the collar and shell into their closed positions, at which time the shell forces the cutters into their operating positions.

In testimony whereof I have signed this specification in the presence of two subscribing witnesses.

JOSEPH P. LAVIGNE.

Witnesses:
LILLIAN D. KELSEY,
FRED. C. EARLE.